Dec. 23, 1952     H. B. REYNOLDS     2,623,119

VOLTAGE LIMITING RECTIFIER UNIT

Filed April 26, 1948

Inventor

Harold B. Reynolds

By Clarence A. O'Brien
and Harvey B. Jacobson
Attorneys

Patented Dec. 23, 1952

2,623,119

UNITED STATES PATENT OFFICE 2,623,119

VOLTAGE LIMITING RECTIFIER UNIT

Harold B. Reynolds, Oneida, N. Y.

Application April 26, 1948, Serial No. 23,209

3 Claims. (Cl. 178—44)

This invention relates to voltage limiters and to similar apparatus and it has for its object to provide a simple and effective limiting unit cutting down the voltage fluctuation produced by a source of A. C. on both halves of the full wave and keeping the peak voltage of the full wave at a constant value.

Voltage limiting circuits and devices are known in which a limiting influence for a source of A. C. is produced by means of a source of D. C. connected with it over a rectifier. Such an arrangement will obviously produce a voltage limitation in one-half wave with the peak voltage equal with the D. C. voltage. This arrangement is however not satisfactory in its simplest form, because the voltage of the D. C. source of current is relatively very high or can only be reduced by means causing losses and because at least two such units or a dual unit duplicating the rectifier and the sources of direct current is necessary to obtain a limiting of the full wave.

It is therefore an object of the present invention to provide an arrangement which is capable of producing a limiting effect on the voltage of the full wave without duplication.

It is a further object of the invention to provide a limiter unit in which the peak voltage will not be larger than one-half of the voltage of the source of D. C.

It is a further object of the invention to provide a limiter unit in which the limiting influence is essentially produced by condensers cooperating with each other, with the source of D. C. currents and with rectifiers.

The invention is illustrated in the accompanying drawing showing a diagram of a single modification by way of example for the purpose of explaining the principle of the invention and one of the modes for applying said principle. The information supplied in the detailed specification will enable the expert skilled in this art to apply the said principle in other ways and in different modifications and modifications of the example shown do therefore not necessarily involve a departure from the invention.

Figure 1:
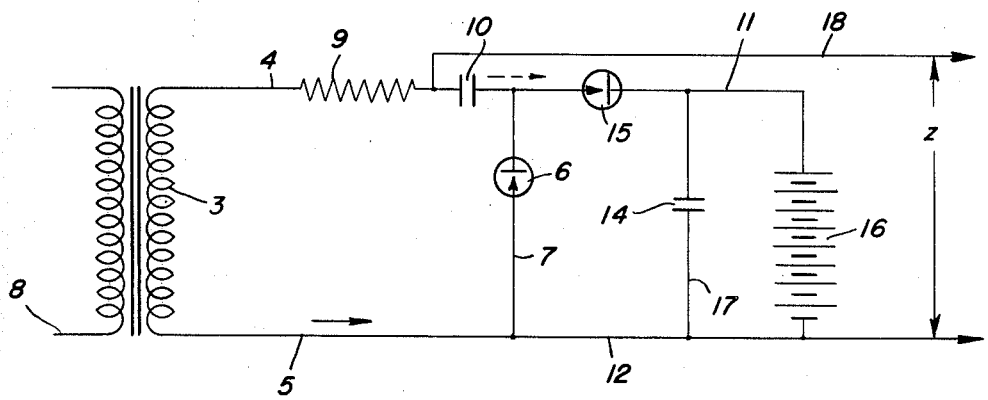
Figure 1 is a diagram of connections.

The diagram shown in Figure 1 shows a source of A. C. currents represented by the secondary of a transformer 3, the primary of which is connected with an A. C. generator or network 8, and a rectifier 6 connected with said transformer secondary 3. This circuit contains conductors 4, 5 and 7 and includes a resistance 9 (which may be some resistance inherent in the circuit or its in components) and a condenser 10. To this circuit the further circuit 11, 12 is connected, containing rectifier 15 and a source of direct current 16 here shown as a battery. A branch 17 arranged in parallel to the said source 16 contains a condenser 14. Conductors 18 and 12 are the output leads.

It will be understood that if branches 7 and 17 with rectifier 6 and condenser 14 are removed, the circuit shows a conventional rectifier circuit in which the output voltage in one half wave is equal to the voltage of the source of D. C. currents, while the other half wave remains unchanged. To limit the latter, two such arrangements have to be combined as above stated.

The operation of the arrangement as shown in the diagram is however the following.

When a current flows from the A. C. source 3 in the direction of the arrow near conductor 5, it will pass the rectifier 6, the condenser 10 and the resistance 9. Condenser 10 is therefore charged and receives, say, a positive charge with the indicated polarity. When the negative phase sets in, the flow of current is indicated by the dotted arrow near conductor 11 and passes through rectifier 15 and condenser 14. The charge on condenser 14 will however have twice the voltage produced in 3, as it is not only charged by 3 but also by the discharge of condenser 10. The next phase repeats the first phase, etc. If there would be no load on the condenser 14 this process stops as the circuit is balanced.

If the voltage of the charge of condenser 14 is higher than that of the D. C. source or battery 16 then the condenser discharges through said source and this forms a load for the source of A. C. current. The voltage of 3 therefore drops, and this causes the source 16 (originally balanced) to overbalance the discharge through condenser 14. This removes the load from the A. C. source 3, whereby its voltage rises again, and this cycle repeats itself.

The output voltage between conductors 12 and 18 will thereby be kept at an approximately constant value as every increase and every decrease initiates a restoring action. This constant voltage will be approximately equal to one-half of the full D. C. source voltage.

Figure 2:
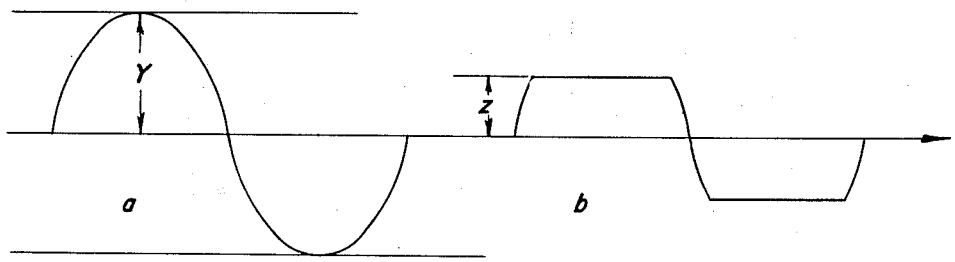
Figure 2 is a diagram of the input and output voltage.

The unit in this way acts as a voltage limiter. The A. C. voltage which may be taken off at 12 and 18 and which would be equal to the D. C. voltage in the conventional system is shown at $a$ in Figure 2 and represented by Y. However when the above described unit is used the voltage will only rise to a certain point, but every further rise is opposed and as long as the voltage, as shown at $b$ in Figure 2, is above (or below) the value Z, it will be practically limited to said value which is substantially one-half of the voltage Y.

It will be noted that both sides of the wave are clipped or limited in the same way and that therefore a constant peak A. C. voltage output is maintained. It will also be clear that the A. C. input voltage may vary within wide limits while the output voltage remains the same.

The limiting unit may be used whenever it is desirable to have a limited peak voltage or output voltage. It can therefore be used, for instance, as a leveler or limiter placed in front of the discriminator of a frequency modulation receiver. It may likewise be used in pulse forming circuits of television transmitters or receivers, or of counters, signalling apparatus and other similar apparatus. A further use is that as a generator for square or trapezoidal waves. Another example is the use of a noise limiting appliance for code reception or amplitude modulated phone reception or the like.

It will finally be understood that the nature of the elements used, such as current sources, rectifiers and the like, does not play any part in the invention and that any known type of units may be used in the above described circuit.

Likewise it will be clear that unessential changes do not affect the invention and that the latter is therefore not limited or affected by such changes.

Having described the invention, what is claimed as new is:

1. A unit for limiting the peak voltage of A. C. current comprising a source of A. C. currents and a voltage multiplying circuit, including two discharge circuits having a common circuit branch and separate circuit branches, each discharge circuit containing a rectifier located in the separate circuit branch, the rectifiers being arranged for passage of current from the source of alternating currents in different directions, a condenser in the common branch and a further condenser in the separate branch of one of the discharge circuits, in series with one of the rectifiers and in parallel to the other rectifier, the aforesaid voltage multiplying circuit producing a full wave rectification with an increased voltage produced by the addition of the two rectified voltages through superposition of the discharge of the condenser in the common branch on one of the rectified half waves, a secondary battery of a maximum voltage less than the increased voltage produced by the aforesaid voltage multiplication, arranged in parallel to said further condenser and an output circuit connected with the source of alternating currents and with the common circuit branch of the two discharge circuits between the first named condenser and the source of alternating currents, the said secondary battery during the phase in which the further condenser carries an increased voltage being charged by said further condenser and producing a load, lowering the voltage of the source of alternating currents delivered into the output circuit, thus limiting the voltage of the currents delivered.

2. A unit for limiting the peak voltage of alternating currents comprising a source of alternating currents and a voltage multiplying circuit, including two discharge circuits with a common circuit branch containing a condenser, and with separate parallel circuit branches connected with said condenser, rectifying means in each of said separate discharge circuit branches, so arranged that electrodes passing current in different directions are connected with said condenser, one of said rectifying means being arranged in series with a further condenser, the condenser in the common branch being charged in one phase by one half wave of the alternating current through one of the separate discharge circuits, and discharging itself during the succeeding half wave passing through the other discharge circuit, thus adding its discharge voltage to the voltage rectified in the last named discharge circuit, a secondary battery of a voltage smaller than that of the increased voltage produced by the voltage multiplying circuit, arranged in parallel to the further condenser in one of the separate discharge circuits branches, and an output circuit connected with the two sides of the source of alternating currents, the voltage of said output circuit being thus limited by the load produced by the charging of the secondary battery during the phase in which an increased voltage prevails in the separate discharge circuit connected with it.

3. A unit for limiting the peak voltage of alternating currents as claimed in claim 1 wherein a resistance is connected in series with the condenser in the common circuit branch and wherein the output circuit is connected with said common branch between said resistance and said condenser.

HAROLD B. REYNOLDS.

REFERENCES CITED

The following references are of record in the file of this patent:

UNITED STATES PATENTS

| Number | Name | Date |
| --- | --- | --- |
| 2,072,278 | Schade | Mar. 2, 1937 |
| 2,227,197 | Percival | Dec. 31, 1940 |
| 2,298,083 | Fyler | Oct. 6, 1942 |
| 2,302,900 | Vance | Nov. 24, 1942 |
| 2,400,326 | Wolf | May 14, 1946 |
| 2,418,480 | Pritchard | Apr. 8, 1947 |
| 2,439,872 | Sanders | Apr. 20, 1948 |
| 2,452,587 | McCoy | Nov. 2, 1948 |
| 2,518,449 | Coe | Aug. 15, 1950 |

FOREIGN PATENTS

| Number | Country | Date |
| --- | --- | --- |
| 118,548 | Australia | June 8, 1944 |